US009678875B2

(12) United States Patent
Hower et al.

(10) Patent No.: US 9,678,875 B2
(45) Date of Patent: Jun. 13, 2017

(54) PROVIDING SHARED CACHE MEMORY ALLOCATION CONTROL IN SHARED CACHE MEMORY SYSTEMS

(71) Applicant: QUALCOMM Incorporated, San Diego, CA (US)

(72) Inventors: Derek Robert Hower, Durham, NC (US); Harold Wade Cain, III, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/861,025

(22) Filed: Sep. 22, 2015

(65) Prior Publication Data
US 2016/0147656 A1 May 26, 2016

Related U.S. Application Data

(60) Provisional application No. 62/084,480, filed on Nov. 25, 2014.

(51) Int. Cl.
*G06F 12/08* (2016.01)
*G06F 12/12* (2016.01)
(Continued)

(52) U.S. Cl.
CPC ............ *G06F 12/084* (2013.01); *G06F 11/34* (2013.01); *G06F 12/0833* (2013.01);
(Continued)

(58) Field of Classification Search
CPC .... G06F 11/34; G06F 12/084; G06F 12/0842; G06F 12/0846; G06F 12/0833;
(Continued)

(56) References Cited

U.S. PATENT DOCUMENTS 7,047,366 B1 5/2006 Ezra
7,725,657 B2 5/2010 Hasenplaugh et al.
(Continued)

OTHER PUBLICATIONS

Iyer, Ravi, "CQoS: A Framework for Enabling QoS in Shared Caches of CMP Platforms," ICS '04, Jun. 26-Jul. 1, 2004, Saint-Malo, France, pp. 257-266.

Ye, Ying et al., "COLORIS: A Dynamic Cache Partitioning System Using Page Coloring," PACT '14 Proceedings of the 23rd International Conference on Parallel architectures and compilation, 2014, ACM, pp. 381-392.

(Continued)

*Primary Examiner* — Aracelis Ruiz
(74) *Attorney, Agent, or Firm* — W&T/Qualcomm

(57) ABSTRACT

Providing shared cache memory allocation control in shared cached memory systems is disclosed. In one aspect, a cache controller of a shared cache memory system comprising a plurality of cache lines is provided. The cache controller comprises a cache allocation circuit providing a minimum mapping bitmask for mapping a Quality of Service (QoS) class to a minimum partition of the cache lines, and a maximum mapping bitmask for mapping the QoS class to a maximum partition of the cache lines. The cache allocation circuit receives a memory access request comprising a QoS identifier (QoSID) of the QoS class, and is configured to determine whether the memory access request corresponds to a cache line of the plurality of cache lines. If not, the cache allocation circuit selects, as a target partition, the minimum partition mapped to the QoS class or the maximum partition mapped to the QoS class.

26 Claims, 8 Drawing Sheets

(51) Int. Cl.
*G06F 11/34* (2006.01)
*G06F 12/084* (2016.01)
*G06F 12/0831* (2016.01)
*G06F 12/128* (2016.01)
*G06F 12/0842* (2016.01)
*G06F 12/0846* (2016.01)

(52) U.S. Cl.
CPC ...... *G06F 12/0842* (2013.01); *G06F 12/0846* (2013.01); *G06F 12/128* (2013.01); *G06F 12/12* (2013.01); *G06F 2212/1016* (2013.01); *G06F 2212/1044* (2013.01); *G06F 2212/314* (2013.01); *G06F 2212/6042* (2013.01); *G06F 2212/62* (2013.01); *G06F 2212/69* (2013.01)

(58) Field of Classification Search
CPC .................. G06F 12/12; G06F 12/128; G06F 2212/1016; G06F 2212/314; G06F 2212/6042; G06F 2212/62; G06F 2212/69; G06F 2212/1044
See application file for complete search history.

(56) References Cited

U.S. PATENT DOCUMENTS

| | | |
|---|---|---|
| 8,621,149 B2 | 12/2013 | Fang et al. |
| 8,751,746 B2 | 6/2014 | Lilly |
| 2008/0235457 A1* | 9/2008 | Hasenplaugh ...... G06F 12/0842 711/130 |
| 2009/0164730 A1 | 6/2009 | Harikumar et al. |
| 2013/0138889 A1 | 5/2013 | Chockler et al. |
| 2013/0304994 A1 | 11/2013 | Koob et al. |
| 2016/0098345 A1* | 4/2016 | Cho ..................... G06F 12/023 711/170 |

OTHER PUBLICATIONS

Zhao, Li et al., "CacheScouts: Fine-Grain Monitoring of Shared Caches in CMP Platforms," 16th International conference on Parallel Architecture and Compilation Techniques, IEEE Computer Society, 2007, pp. 339-349.
International Search Report and Written Opinion of PCT/US2015/059677, mailed Feb. 4, 2016, 14 pages.

* cited by examiner

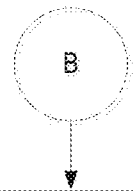

308
SELECT, AS A TARGET PARTITION, ONE OF A MINIMUM PARTITION (206(0)) MAPPED TO THE QoS CLASS (112(0)) CORRESPONDING TO THE QoSID (120) BY A MINIMUM MAPPING BITMASK (200(0)) AND A MAXIMUM PARTITION (208(0)) MAPPED TO THE QoS CLASS (112(0)) CORRESPONDING TO THE QoSID (120) BY A MAXIMUM MAPPING BITMASK (202(0))

310
SELECT THE ONE OF THE MINIMUM PARTITION (206(0)) AND THE MAXIMUM PARTITION (208(0)) TO CAUSE AN ACTUAL ALLOCATION OF CACHE LINES (106(0)-106(L)) ALLOCATED TO THE QoS CLASS (112(0)) CORRESPONDING TO THE QoSID (120) TO APPROACH THE AVERAGE ALLOCATION TARGET VALUE (204(0))

312
SELECTION BASED ON AN INDICATION (122) OF AN ALLOCATION OF THE PLURALITY OF CACHE LINES (106(0)-106(L)) AMONG THE PLURALITY OF QoS CLASSES (112(0)-112(N)) PROVIDED BY A CACHE USAGE MONITOR (124)

314
PROBABILISTICALLY SELECT ONE OF THE MINIMUM PARTITION (206(0)) AND THE MAXIMUM PARTITION (208(0))

316
PROBABILISTIC SELECTION BASED ON A PROBABILITY FUNCTION PROVIDER CIRCUIT (126)

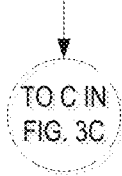

*FIG. 3B*

PROVIDING SHARED CACHE MEMORY ALLOCATION CONTROL IN SHARED CACHE MEMORY SYSTEMS

PRIORITY CLAIM

The present application claims priority under 35 U.S.C. §119(e) to U.S. Provisional Patent Application Ser. No. 62/084,480 filed on Nov. 25, 2014, and entitled "PROVIDING FINE-GRAINED AND FLEXIBLE SHARED CACHE MEMORY ALLOCATION CONTROL, AND RELATED METHODS AND SYSTEMS," the contents of which is incorporated herein by reference in its entirety.

BACKGROUND

I. Field of the Disclosure

The technology of the disclosure relates generally to shared cache memory systems, and, in particular, to controlling allocation of shared cache memory.

II. Background

An increasing number of computer hardware units (e.g. central processing units (CPUs), graphics processing units (GPUs), digital signal processing (DSP) units, and/or direct memory access (DMA) engines, as non-limiting examples) are configured to share memory system resources such as caches, memory, interconnect bandwidth, and cache bandwidth. Resource interference and conflicts between computer hardware units could result in negative consequences, such as missing a real-time deadline on a mobile System-on-Chip (SoC), or violating a Service Level Agreement (SLA) on a consolidated server, as non-limiting examples. Additionally, reference streams associated with some computer hardware units may have little temporal locality, leading to cache pollution and a negative impact on overall performance if left unchecked. In this regard, it may be desirable to enable users to control the usage of shared resources.

However, unlike most other performance-critical components of a system (e.g., CPU usage, memory usage, network bandwidth, and/or disk bandwidth), allocation of a conventional shared cache memory remains largely outside the control of users. As a result, such conventional shared cache memory systems may remain underutilized to protect against worst case performance in the presence of cache interference. Moreover, existing cache Quality of Service (QoS) and partitioning schemes may lack the flexibility necessary to address multiple use cases, such as strict capacity allocation and/or throughput maximization, as non-limiting examples.

SUMMARY OF THE DISCLOSURE

Aspects disclosed in the detailed description include providing shared cache memory allocation control in a shared cache memory system. In this regard, in one aspect, a cache controller of a shared cache memory is provided. The cache controller supports a plurality of Quality of Service (QoS) classes, each of which corresponds to a QoS identifier (QoSID). The cache controller provides a cache allocation circuit, which enables cache lines of the shared cache memory to be selectively allocated based on a QoSID of a memory access request received by the cache controller. The cache allocation circuit comprises a minimum mapping bitmask, which maps a QoS class to a minimum partition of the cache lines of the shared cache memory. The minimum partition represents a smallest portion of the shared cache memory that may be allocated to the QoS class. Similarly, the cache allocation circuit also comprises a maximum mapping bitmask, which maps the QoS class to a maximum partition of the cache lines of the shared cache memory. The maximum partition represents a largest portion of the shared cache memory that may be allocated to the QoS class. Upon receiving a memory access request, the cache allocation circuit determines whether the memory access request corresponds to a cache line of a plurality of cache lines. If not (i.e., if a cache miss occurs), the cache allocation circuit selects as a target partition either the minimum partition mapped to the QoS class corresponding to the QoSID by the minimum mapping bitmask or the maximum partition mapped to the QoS class corresponding to the QoSID by the maximum mapping bitmask. The cache allocation circuit then allocates a cache line within the target partition for a cache fill operation. In this manner, the shared cache memory may be partitioned among multiple QoS classes to enable fine-grained and flexible control over allocation of the cache lines of the shared cache memory.

In another aspect, a cache controller of a shared cache memory system is provided. The shared cache memory system comprises a plurality of cache lines. The cache controller comprises a cache allocation circuit. The cache allocation circuit comprises a minimum mapping bitmask for mapping a QoS class of a plurality of QoS classes to a minimum partition of the plurality of cache lines. The cache allocation circuit further comprises a maximum mapping bitmask for mapping the QoS class of the plurality of QoS classes to a maximum partition of the plurality of cache lines. The cache allocation circuit is configured to receive a memory access request comprising a QoS identifier (QoSID) corresponding to the QoS class of the plurality of QoS classes. The cache allocation circuit is further configured to determine whether the memory access request corresponds to a cache line of the plurality of cache lines. The cache allocation circuit is also configured to, responsive to determining that the memory access request does not correspond to the cache line of the plurality of cache lines, select, as a target partition, one of the minimum partition mapped to the QoS class corresponding to the QoSID by the minimum mapping bitmask and the maximum partition mapped to the QoS class corresponding to the QoSID by the maximum mapping bitmask. The cache allocation circuit is additionally configured to allocate a cache line within the target partition for a cache fill operation.

In another aspect, a cache controller of a shared cache memory system is provided. The cache controller comprises a means for receiving a memory access request comprising a QoSID corresponding to a QoS class of a plurality of QoS classes. The cache controller further comprises a means for determining whether the memory access request corresponds to a cache line of a plurality of cache lines of the shared cache memory system. The cache controller also comprises a means for selecting, as a target partition, one of a minimum partition mapped to the QoS class corresponding to the QoSID by a minimum mapping bitmask and a maximum partition mapped to the QoS class corresponding to the QoSID by a maximum mapping bitmask, responsive to determining that the memory access request does not correspond to the cache line of the plurality of cache lines. The cache controller additionally comprises a means for allocating the cache line of the plurality of cache lines within the target partition for a cache fill operation, responsive to determining that the memory access request does not correspond to the cache line of the plurality of cache lines.

In another aspect, a method for allocating cache lines of a shared cache memory system is provided. The method comprises receiving, by a cache allocation circuit of a cache controller, a memory access request comprising a QoSID corresponding to a QoS class of a plurality of QoS classes. The method further comprises determining whether the memory access request corresponds to a cache line of a plurality of cache lines of the shared cache memory system. The method also comprises, responsive to determining that the memory access request does not correspond to the cache line of the plurality of cache lines, selecting, as a target partition, one of a minimum partition mapped to the QoS class corresponding to the QoSID by a minimum mapping bitmask and a maximum partition mapped to the QoS class corresponding to the QoSID by a maximum mapping bitmask. The method additionally comprises allocating the cache line of the plurality of cache lines within the target partition for a cache fill operation.

BRIEF DESCRIPTION OF THE FIGURES

FIGS. 3A-3C are flowcharts illustrating exemplary operations of the cache controller of FIG. 1 for providing shared cache memory allocation control.

DETAILED DESCRIPTION

Figure 1:
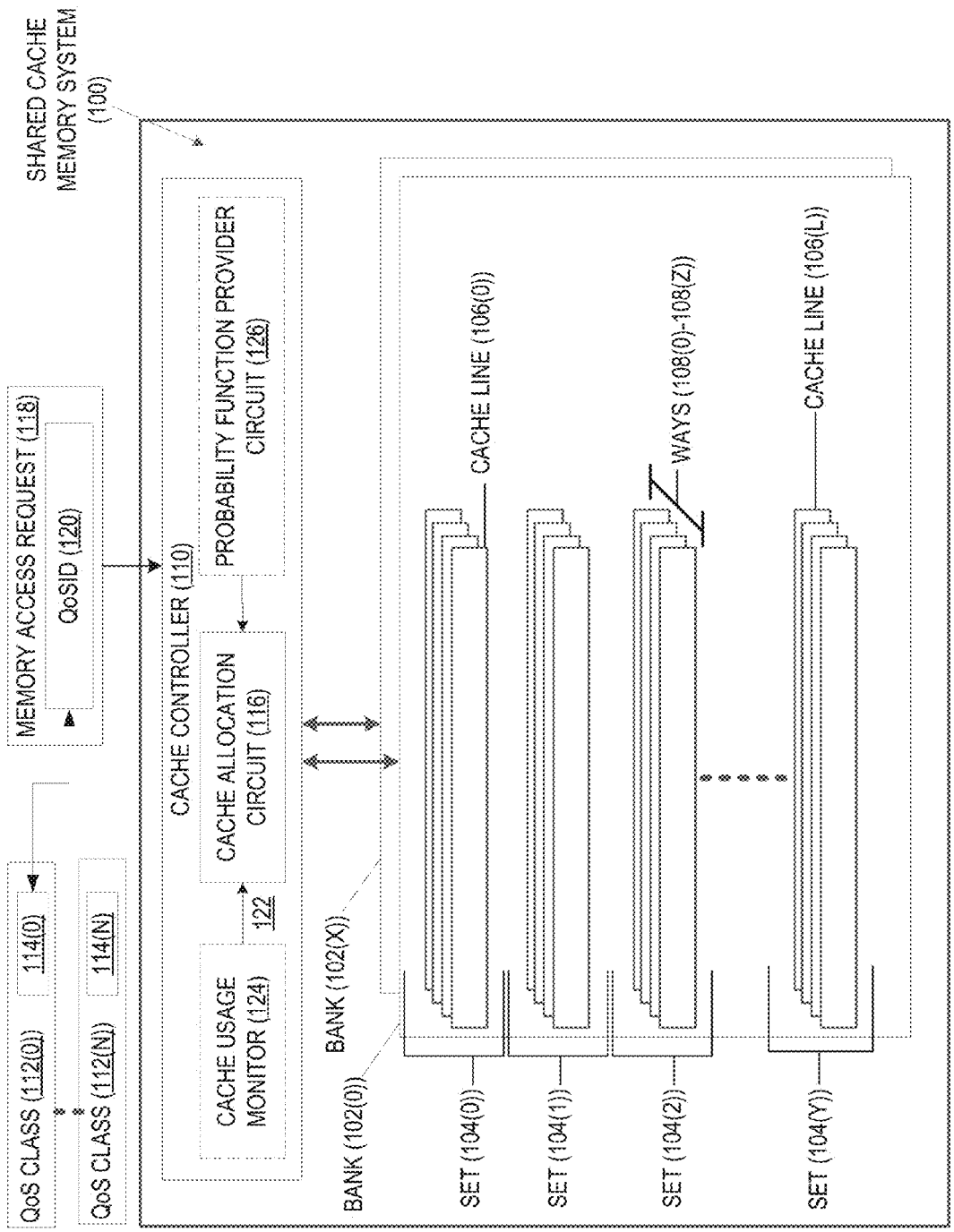
FIG. 1 is a block diagram illustrating an exemplary shared cache memory system including a cache controller comprising a cache allocation circuit for providing shared cache memory allocation control.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

In this regard, FIG. 1 is provided to illustrate a structure of a shared cache memory system 100. The shared cache memory system 100 may be provided in a semiconductor die, as a non-limiting example. In some aspects, the shared cache memory system 100 may be a level 1 (L1) cache, a level 2 (L2) cache, or a level 3 (L3) cache, among others, in a hierarchy of memories (not shown). 106(L)106(L)106(L) In the example of FIG. 1, the shared cache memory system 100 is a memory array organized into banks 102(0)-102(X). Each of the banks 102(0)-102(X) comprises one or more sets 104(0)-104(Y), with each of the sets 104(0)-104(Y) made up of a subset of cache lines 106(0)-106(L). The number Z of the cache lines 106(0)-106(L) in each of the sets 104(0)-104(Y) is referred to as the "associativity" of the shared cache memory system 100, and the group of cache lines 106(0)-106(L) located at a particular position from 0-Z within each of the sets 104(0)-104(Y) is referred to as a corresponding "way" 108(0)-108(Z). Each way 108(0)-108(Z) may thus be visualized as a vertical "slice" of the cache lines 106(0)-106(L) across all of the sets 104(0)-104(Y).

It is to be understood that aspects described herein are not restricted to any particular arrangement of elements, and the disclosed techniques may be easily extended to various structures and layouts of the shared cache memory system 100. The configuration illustrated in FIG. 1 is for illustrative purposes only. In some aspects, the shared cache memory system 100 may comprise fewer or more banks 102(0)-102(X), fewer or more sets 104(0)-104(Y), fewer or more cache lines 106(0)-106(L), and/or fewer or more ways 108(0)-108(Z) than illustrated herein.

With continued reference to FIG. 1, a cache controller 110 is connectively coupled to each bank 102(0)-102(X). In conventional operation, a requesting agent (not shown), such as an executing software application, may request an instruction or value (not shown) stored at a memory address (not shown). If the requested instruction or value is not found in the shared cache memory system 100, a cache miss results. In response, the cache controller 110 may initiate a cache fill operation, which causes a portion of system memory (not shown) equal to the size of one or more of the cache lines 106(0)-106(L), and containing the requested instruction or value, to be retrieved and stored in one of the cache lines 106(0)-106(L).

The shared cache memory system 100 provides support for multiple QoS classes 112(0)-112(N) for implementing QoS support for shared memory usage. Each of the QoS classes 112(0)-112(N) is associated with a unique QoSID 114(0)-114(N). To more efficiently allocate the cache lines 106(0)-106(L) among multiple requesting agents, the cache controller 110 in some aspects may provide a cache allocation circuit 116. The cache allocation circuit 116 may enable user control of cache resources of the shared cache memory system 100 by associating each of the QoSIDs 114(0)-114(N) with a particular requesting agent, and specifying an allocation of the cache lines 106(0)-106(L) for that QoSID 114(0)-114(N).

While a conventional cache controller may enable allocation of the cache lines 106(0)-106(L), the conventional cache controller may not provide the flexibility needed to address different use cases. For example, in a cloud computing environment use case, it may be desirable to provide strict allocation of the cache lines 106(0)-106(L), such that multiple executing virtual machines (VMs) have exclusive access to a subset of the cache lines 106(0)-106(L). In other use cases, a more flexible allocation may be desirable. Using the flexible allocation mechanism, cache usages approach specified average values under full utilization of the shared cache memory system 100. Under low contention, or when a cache consumer is running alone, usage should approach a stated maximum allocation. When a cache consumer is not running, usage should approach a stated minimum. Finally, when a cache consumer does not require enough cache lines 106(0)-106(L) to meet average allocation, extra capacity should be used by another class.

In this regard, the cache allocation circuit 116 provides a minimum mapping bitmask (not shown) and a maximum mapping bitmask (not shown) for each of one or more of the QoS classes 112(0)-112(N). Each minimum mapping bitmask is used to map the corresponding QoS class 112(0)-112(N) to a minimum partition of the plurality of cache lines 106(0)-106(L) (i.e., a minimum portion of the plurality of cache lines 106(0)-106(L) that may be allocated to that QoS class 112(0)-112(N)). Likewise, each maximum mapping bitmask maps its corresponding QoS class 112(0)-112(N) to a maximum partition of the plurality of cache lines 106(0)-106(L), representing a maximum portion of the plurality of cache lines 106(0)-106(L) that may be allocated to that QoS class 112(0)-112(N). In some aspects, the minimum mapping bitmasks may be stored in a minimum mapping table (not shown), while the maximum mapping bitmasks may be stored in a maximum mapping table (not shown).

For each minimum mapping bitmask and maximum mapping bitmask comprised of a number N of bits, each bit corresponds to a disjoint 1/N partition of the plurality of cache lines 106(0)-106(L) of the shared cache memory system 100. Each of the minimum mapping bitmasks and the maximum mapping bitmasks thus represents a logical view of a cache partitioning, with specific aspects determining how the minimum mapping bitmasks and maximum mapping bitmasks are translated into a realizable partitioning. As discussed in greater detail below, some aspects may also provide that an average allocation target value (not shown) is specified for each of the QoS classes 112(0)-112(N). In such aspects, an average allocation target value may be specified as a percentage of the cache lines 106(0)-106(L) of the shared cache memory system 100, and may be used as a target allocation when the minimum mapping bitmasks and the maximum mapping bitmasks associated with each QoS class 112(0)-112(N) differ.

The cache allocation circuit 116 is further configured to receive a memory access request 118 from a requesting agent (not shown). The memory access request 118 includes a QoSID 120 that corresponding to one of the QoS classes 112(0)-112(N). In the example of FIG. 1, the QoSID 120 corresponds to the QoSID 114(0) of the QoS class 112(0). The cache allocation circuit 116 determines whether the memory access request 118 corresponds to one of the plurality of cache lines 106(0)-106(L) of the shared cache memory system 100. If the memory access request 118 does not correspond to any of the plurality of cache lines 106(0)-106(L) (i.e., a cache miss), the cache allocation circuit 116 selects either the minimum partition mapped to the QoS class 112(0) corresponding to the QoSID 120 by the minimum mapping bitmask or the maximum partition mapped to the QoS class 112(0) corresponding to the QoSID 120 by the maximum mapping bitmask. As discussed in greater detail below, in some aspects, the cache allocation circuit 116 may deterministically select the minimum mapping bitmask or the maximum mapping bitmask as necessary to ensure that cache usage approaches the average allocation target value, or may probabilistically select the minimum mapping bitmask or the maximum mapping bitmask.

The cache allocation circuit 116 then allocates one of the cache lines 106(0)-106(L) within the target partition for a cache fill operation. In some aspects, the cache allocation circuit 116 may allocate one of the cache lines 106(0)-106(L) by first identifying one or more cache lines 106(0)-106(L) within the target partition as one or more eviction candidates (referred to herein as "eviction candidates 106(0)-106(L)"). The cache allocation circuit 116 may then evict an eviction candidate 106(0)-106(L) of the one or more eviction candidates 106(0)-106(L) from the shared cache memory system 100.

By allocating the cache lines 106(0)-106(L) among the QoSIDs 114(0)-114(N) (thus effectively allocating the cache lines 106(0)-106(L) among the corresponding QoS classes 112(0)-112(N)), the shared cache memory system 100 may improve cache performance in a number of use case scenarios. For example, in some aspects, the shared cache memory system 100 may enable servicing of real-time constraints to ensure that latency-critical operations carried out by requesting agents have sufficient cache memory to satisfy real-time requirements. To provide service responsive to real-time constraints, the cache allocation circuit 116 may be configured to guarantee that a minimum working set of the cache lines 106(0)-106(L) for a time-critical requesting agent will be preserved in the shared cache memory system 100. Allocation of the cache lines 106(0)-106(L) by the cache allocation circuit 116 may also be useful in enforcing cloud computing Service Level Agreements (SLAs), and/or for restricting the cache allotment of the cache lines 106(0)-106(L) for certain requesting agents to improve the overall throughput of a computer processing system. Exemplary minimum and maximum mapping bitmasks employed by the cache allocation circuit 116 of FIG. 1 for enforcing allocation of the shared cache memory system 100 of FIG. 1 in different use cases are discussed in greater detail below with respect to FIGS. 2A-2C.

In some aspects, the cache allocation circuit 116 may also provide an average allocation target value for each of the QoS classes 112(0)-112(N). When subsequently selecting either the minimum partition or the maximum partition as the target partition for the QoS class 112(0)-112(N) corresponding to the QoSID 120, the cache allocation circuit 116 may base its selection on whichever target partition will cause an actual allocation of the cache lines 106(0)-106(L) allocated to the QoS class 112(0)-112(N) to approach the average allocation target value. Thus, when the QoS class 112(0)-112(N) is actively running in a contended system, the cache allocation circuit 116 will attempt to keep the actual allocation of the plurality of cache lines 106(0)-106(L) for the QoS class 112(0)-112(N) near the average allocation target value. If the QoS class 112(0)-112(N) is not scheduled, or if the QoS class 112(0)-112(N) is using an allocation of the plurality of cache lines 106(0)-106(L) that is smaller than the average allocation, the actual allocation will approach a minimum level represented by the corresponding minimum mapping bitmask. If the QoS class 112(0)-112(N) is running in isolation or with other workloads that have light cache pressure, the actual allocation will approach a maximum level represented by the corresponding maximum mapping bitmask.

According to some aspects, the cache allocation circuit 116 may use an indication 122 of an allocation of the plurality of cache lines 106(0)-106(L) among the plurality of QoS classes 112(0)-112(N) from a cache usage monitor 124 to guide the selection of the minimum partition or the maximum partition as the target partition. As a non-limiting example, the indication 122 may represent an approximate measurement of cache usage by a given QoS class 112(0)-112(N). Based on the indication 122, the cache allocation circuit 116 in some aspects may then select the minimum partition or the maximum partition as needed to cause cache allocation for that QoS class 112(0)-112(N) to trend towards an average allocation target value.

By using either the minimum mapping bitmask or the maximum mapping bitmask to determine partitioning during cache fill operations, the resulting allocation of the plurality of cache lines 106(0)-106(L) will naturally oscillate between the minimum and maximum usages. For example, if the cache allocation circuit 116 selects the minimum mapping bitmask, the cache usage for the corresponding QoS class 112(0)-112(N) will taper towards its minimum partition. If the cache allocation circuit 116 selects the maximum mapping bitmask, the cache usage for the corresponding QoS class 112(0)-112(N) will increase towards the maximum partition. Accordingly, in some aspects, the cache allocation circuit 116 may deterministically select the minimum mapping bitmask when the current cache usage is above the average allocation target value, and the maximum mapping bitmask when the current cache usage is below the average allocation target value.

In some aspects, it may be desirable for the cache allocation circuit 116 to probabilistically select the minimum mapping bitmask or the maximum mapping bitmask, such that the cache allocation circuit 116 periodically selects the "wrong" bitmask (i.e., the bitmask that results in the current cache usage moving away from the average allocation target value). By selecting probabilistically, the cache allocation circuit 116 may be more effective at exploring cache allocations that favor the natural caching patterns for each of the QoS classes 112(0)-112(N), resulting in more effective and efficient use of the shared cache memory system 100.

According to some aspects, the cache allocation circuit 116 may be configured to probabilistically select the minimum mapping bitmask or the maximum mapping bitmask based on a probability function (not shown) provided by a probability function provider circuit 126. Some aspects may provide that the probability function provider circuit 126 may be based on a linear probability function and/or a sigmoid probability function, as non-limiting examples. For instance, a linear probability function may be preferable in aspects in which ease of implementation is important. According to some aspects, the use of a sigmoid probability function may result in a faster trend toward the average allocation target value, thereby enabling the cache allocation circuit 116 to be more responsive as changes occur (e.g., circumstances in which a QoS class 112(0)-112(N) has frequent phase changes, as a non-limiting example). In aspects employing a sigmoid probability function, the probability function provider circuit 126 may be implemented as a prepopulated hardware lookup table (not shown) in conjunction with a linear feedback shift register (not shown) as a source of randomness. An exemplary sigmoid function that takes shape parameter $\mu$ is shown below:

$$x = \frac{average - usage}{average - min}, \; y = \frac{usage - average}{max - average}$$

$$P(m) = \begin{cases} usuage < average: \frac{1}{2} - \frac{\ln(xe^\mu + 1/\mu)}{2\mu} \\ usage >= average: \frac{1}{2} + \frac{\ln(ye^\mu + 1/\mu)}{2\mu} \end{cases}$$

Figure 2A:
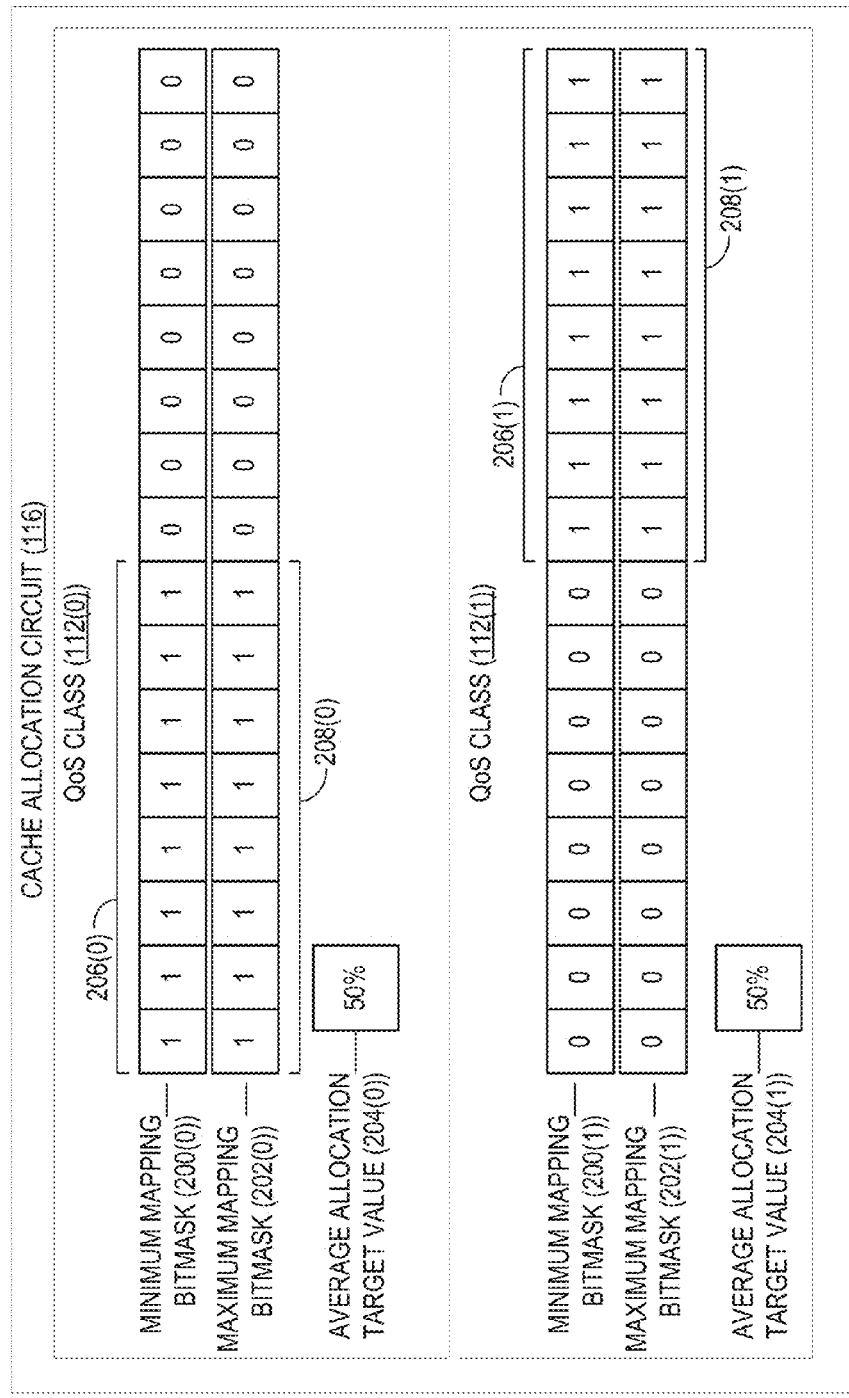
FIGS. 2A-2C are block diagrams illustrating exemplary minimum and maximum mapping bitmasks employed by the cache allocation circuit of FIG. 1 for enforcing allocation of the shared cache memory system of FIG. 1.
Figure 2B:
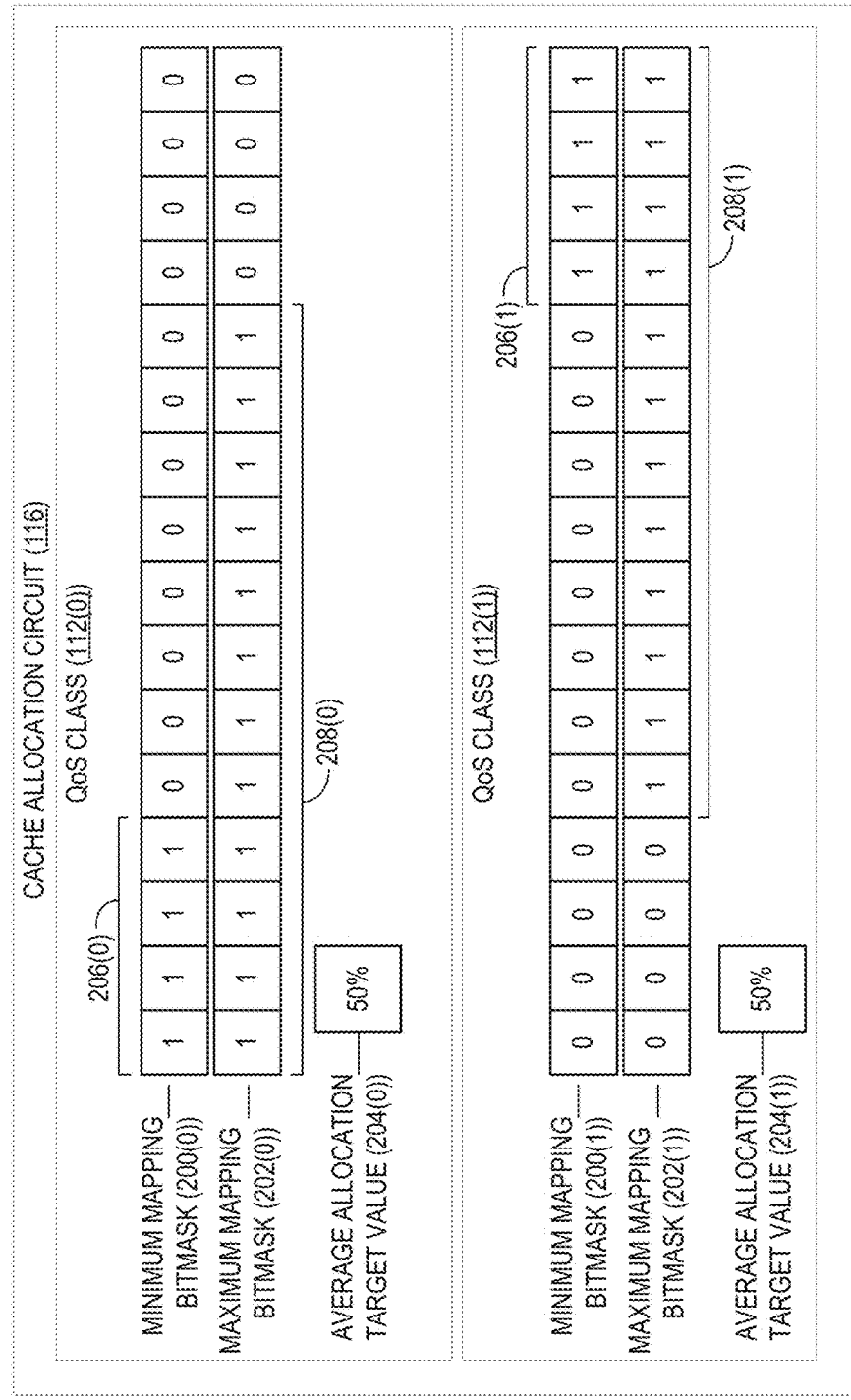
Figure 2C:
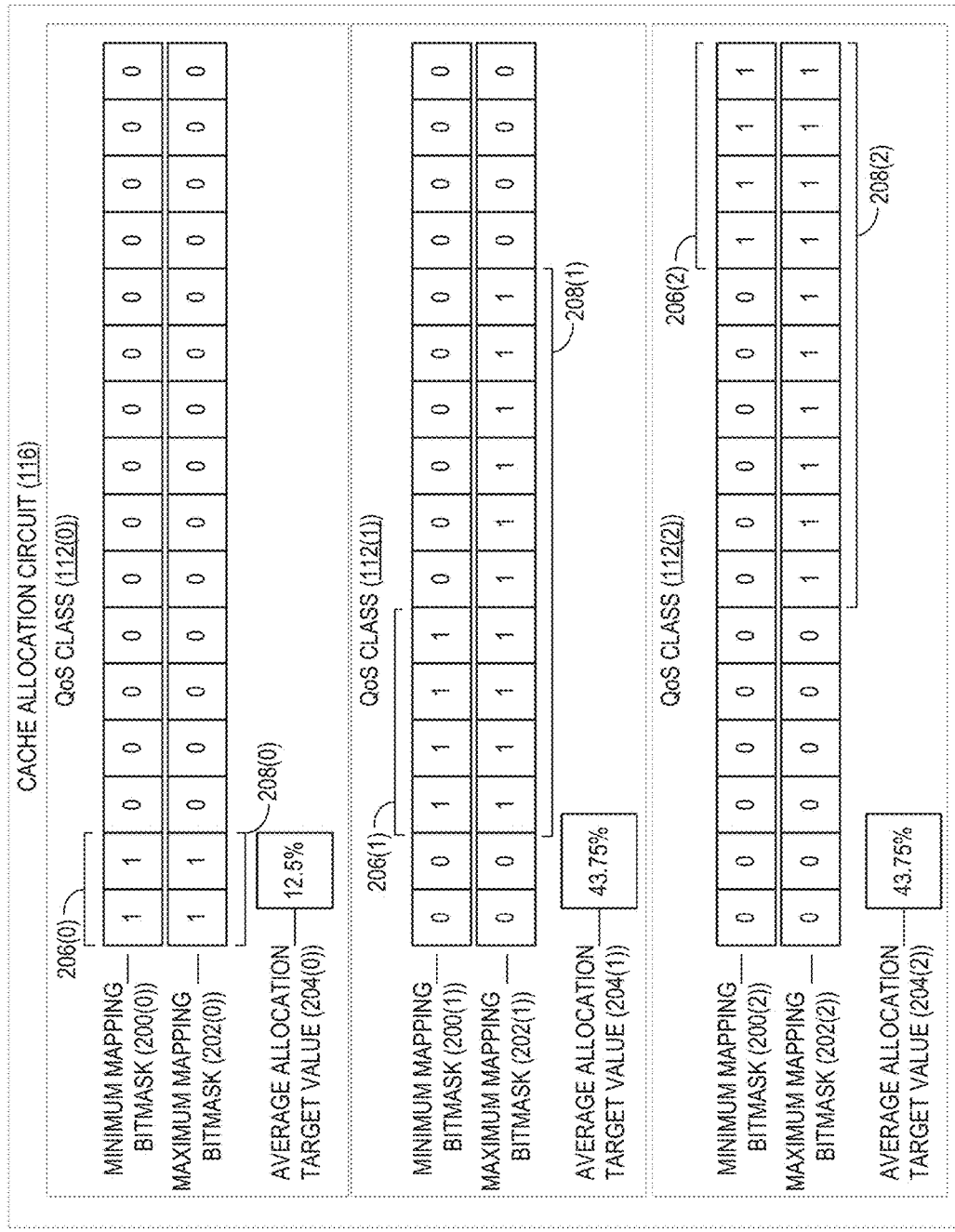

To illustrate exemplary minimum and maximum mapping bitmasks that may be employed by the cache allocation circuit 116 of FIG. 1 for enforcing allocation of the shared cache memory system 100, FIGS. 2A-2C are provided. In particular, FIG. 2A illustrates exemplary minimum mapping bitmasks and maximum mapping bitmasks that may be used to strictly isolate the QoS classes 112(0) and 112(1) from each other. FIG. 2B illustrates exemplary minimum mapping bitmasks for mapping the QoS classes 112(0), 112(1) to minimum partitions that are exclusive to each QoS class 112(0), 112(1), and exemplary maximum mapping bitmasks for mapping the QoS classes 112(0), 112(1) to maximum partitions that are not exclusive to each QoS class 112(0), 112(1). FIG. 2C illustrates exemplary minimum mapping bitmasks and maximum mapping bitmasks that may be used to reduce the impact of QoS classes 112(0)-112(N) that may result in cache thrashing. In FIGS. 2A-2C, the QoS classes 112(0)-112(2) are associated with minimum mapping bitmasks 200(0)-200(2), maximum mapping bitmasks 202(0)-202(2), and average allocation target values 204(0)-204(2), respectively, by the cache allocation circuit 116. The minimum mapping bitmasks 200(0)-200(2) map minimum partitions 206(0)-206(2) for the QoS classes 112(0)-112(2), while the maximum mapping bitmasks 202(0)-202(2) map maximum partitions 208(0)-208(2) for the QoS classes 112(0)-112(2).

In the example of FIG. 2A, the minimum mapping bitmasks 200(0), 200(1) and the maximum mapping bitmasks 202(0), 202(1) map the QoS classes 112(0), 112(1) to a same target partition of the plurality of cache lines 106(0)-106(L) that is exclusive to each QoS class 112(0), 112(1). This results in the QoS classes 112(0), 112(1) being strictly isolated from one another within the shared cache memory system 100, which may be desirable in use cases such as cloud computing applications. Because the minimum mapping bitmasks 200(0), 200(1) and the maximum mapping bitmasks 202(0), 202(1) are the same for a given QoS class 112(0), 112(1), the QoS classes 112(0), 112(1) will never exceed the usage specified by the minimum mapping bitmasks 200(0), 200(1) and the maximum mapping bitmasks 202(0), 202(1). In some aspects in which the minimum mapping bitmasks 200(0), 200(1) and the maximum mapping bitmasks 202(0), 202(1) are the same, the cache allocation circuit 116 may use a single one of the minimum mapping bitmasks 200(0), 200(1) and the maximum mapping bitmasks 202(0), 202(1) when selecting a target partition.

In FIG. 2B, each of the maximum mapping bitmasks 202(0), 202(1) is specified as a superset of the respective minimum mapping bitmask 200(0), 200(1) for a given QoS class 112(0), 112(1). Consequently, the minimum mapping bitmasks 200(0), 200(1) map the QoS class 112(0), 112(1) to the minimum partitions 206(0), 206(1) that are exclusive to the QoS classes 112(0), 112(1). Similarly, the maximum mapping bitmasks 202(0), 202(1) map the QoS class 112(0), 112(1) to the maximum partitions 208(0), 208(1) that are not exclusive to the QoS classes 112(0), 112(1) (i.e., portions of the maximum partitions 208(0), 208(1) are shared between the QoS classes 112(0), 112(1)). This configuration may allow a user to ensure that the QoS classes 112(0), 112(1) each has exclusive access to a portion of the plurality of cache lines 106(0)-106(L), but also allow the QoS classes 112(0), 112(1) to use more of the plurality of cache lines 106(0)-106(L) under light contention. As seen in FIG. 2B, the QoS classes 112(0), 112(1) are guaranteed a minimum allocation of 25%, but are allowed to use up to 75% of the plurality of cache lines 106(0)-106(L) when no low-priority applications are running or when those low-priority applications are not using more than 25% of the plurality of cache lines 106(0)-106(L). Note that in this configuration, the placement of bits is important. In particular, the QoS classes 112(0), 112(1) each are exclusively given 25% of the plurality of cache lines 106(0)-106(L) because the bits in their minimum mapping bitmasks 200(0), 200(1) do not overlap.

Referring now to FIG. 2C, to maximize throughput, the minimum mapping bitmasks 200(0)-200(2) and the maximum mapping bitmasks 202(0)-202(2) may be set to reduce the impact of applications that thrash the cache. In the example of FIG. 2C, the minimum mapping bitmask 200(0) and the maximum mapping bitmask 202(0) strictly limit the allocation for the QoS class 112(0). The minimum mapping bitmasks 200(1), 200(2) and the maximum mapping bitmask 202(1), 202(2) enable the QoS classes 112(1), 112(2) to share the remainder of the plurality of cache lines 106(0)-106(L), while ensuring a minimum allocation for the QoS classes 112(1), 112(2). As a result, any thrashing of the cache caused by applications associated with QoS classes 112(1), 112(2) will be limited to the overlapping partitions of the maximum partitions 208(1), 208(2), and will not affect the remainder of the cache.

Figure 3A:
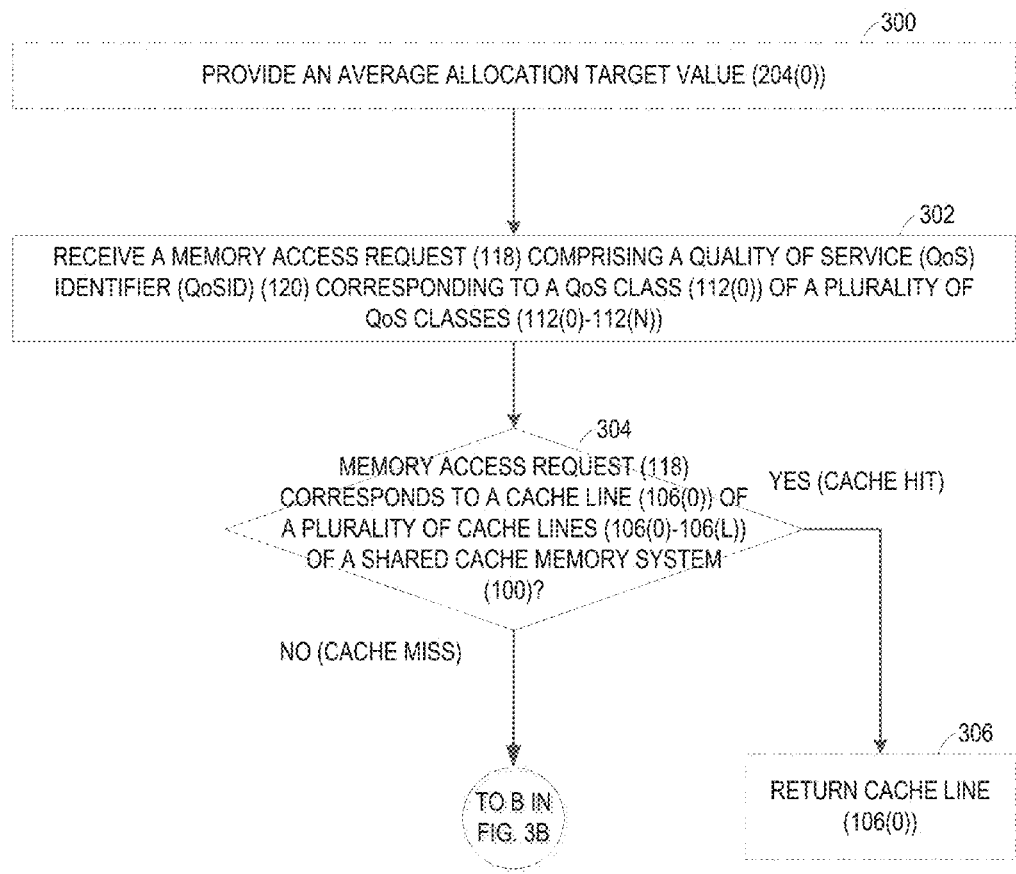
Figure 3C:
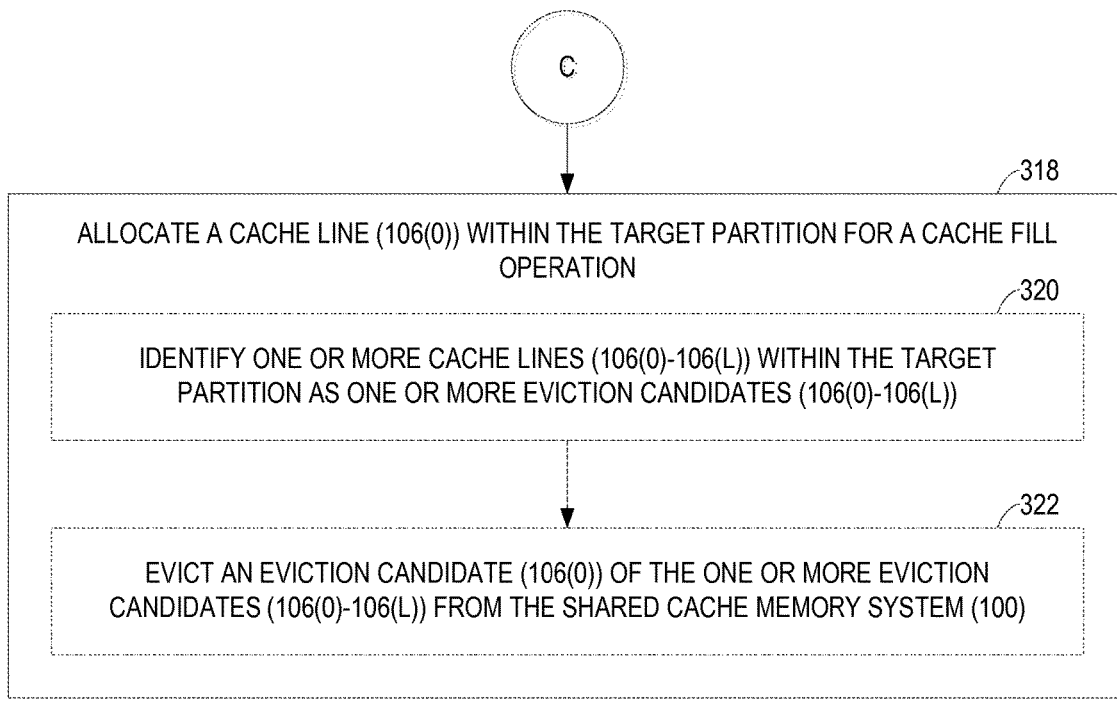

FIGS. 3A-3C are flowcharts illustrating exemplary operations of the cache allocation circuit 116 of FIG. 1 for providing shared cache memory allocation control. For the sake of clarity, elements of FIGS. 1 and 2A-2C are referenced in describing FIGS. 3A-3C. In some aspects, operations begin with the cache allocation circuit 116 providing an average allocation target value 204(0) (block 300). Accordingly, the cache allocation circuit 116 may be referred to herein as "a means for providing an average allocation target value." The cache allocation circuit 116 receives a memory access request 118 comprising a QoSID 120 corresponding to a QoS class 112(0) of a plurality of QoS classes 112(0)-112(N) (block 302). The cache allocation circuit 116 thus may be referred to herein as "a means for receiving a memory access request comprising a QoSID corresponding to a QoS class of a plurality of QoS classes."

The cache allocation circuit 116 then determines whether the memory access request 118 corresponds to a cache line 106(0) of the plurality of cache lines 106(0)-106(L) of the shared cache memory system 100 (block 304). In this regard, the cache allocation circuit 116 may be referred to herein as "a means for determining whether the memory access request corresponds to a cache line of a plurality of cache lines of the shared cache memory system." If the cache allocation circuit 116 determines at decision block 304 that the memory access request 118 corresponds to a cache line 106(0) of the plurality of cache lines 106(0)-106(L), the cache allocation circuit 116 returns the cache line 106(0) (i.e., a cache hit) (block 306). However, if the memory access request 118 does not correspond to a cache line 106(0) of the plurality of cache lines 106(0)-106(L) (i.e., a cache miss), processing resumes at block 308 of FIG. 3B.

Referring now to FIG. 3B, the cache allocation circuit 116 selects, as a target partition, one of a minimum partition 206(0) mapped to the QoS class 112(0) corresponding to the QoSID 120 by a minimum mapping bitmask 200(0) and a maximum partition 208(0) mapped to the QoS class 112(0) corresponding to the QoSID 120 by a maximum mapping bitmask 202(0) (block 308). Accordingly, the cache allocation circuit 116 may be referred to herein as "a means for selecting, as a target partition, one of a minimum partition mapped to the QoS class corresponding to the QoSID by a minimum mapping bitmask and a maximum partition mapped to the QoS class corresponding to the QoSID by a maximum mapping bitmask." In some aspects, the operations of block 308 for selecting the one of the minimum partition 206(0) and the maximum partition 208(0) include selecting the one of the minimum partition 206(0) and the maximum partition 208(0) to cause an actual allocation of cache lines 106(0)-106(L) allocated to the QoS class 112(0) corresponding to the QoSID 120 to approach the average allocation target value 204(0) (block 310). The cache allocation circuit 116 thus may be referred to herein as "a means for selecting the one of the minimum partition and the maximum partition to cause an actual allocation of cache lines allocated to the QoS class corresponding to the QoSID to approach the average allocation target value." Some aspects may provide that the operations of block 310 for selecting the one of the minimum partition 206(0) and the maximum partition 208(0) are based on an indication 122 of an allocation of the plurality of cache lines 106(0)-106(L) among the plurality of QoS classes 112(0)-112(N) provided by a cache usage monitor 124 (block 312). As a non-limiting example, the indication 122 may represent an approximate measurement of cache usage by a given QoS class 112(0)-112(N). Based on the approximate measurement of cache usage indicated by the indication 122, the cache allocation circuit 116 in some aspects may then select the minimum partition or the maximum partition as needed to cause cache allocation for that QoS class 112(0)-112(N) to trend towards the average allocation target value 204(0). In this regard, the cache allocation circuit 116 may be referred to herein as "a means for selecting the one of the minimum partition and the maximum partition based on an indication of an allocation of the plurality of cache lines among the plurality of QoS classes provided by a cache usage monitor."

In some aspects, the operations of block 308 for selecting the one of the minimum partition 206(0) and the maximum partition 208(0) by the cache allocation circuit 116 include probabilistically selecting one of the minimum partition 206(0) and the maximum partition 208(0) (block 314). Accordingly, the cache allocation circuit 116 may be referred to herein as "a means for probabilistically selecting one of the minimum partition and the maximum partition." Some aspects may provide that the operations of block 314 for probabilistically selecting one of the minimum partition 206(0) and the maximum partition 208(0) are based on a probability function provider circuit 126 (block 316). Processing resumes at block 318 of FIG. 3C.

Turning now to FIG. 3C, the cache allocation circuit 116 next allocates a cache line 106(0) within the target partition for a cache fill operation (block 318). In this regard, the cache allocation circuit 116 may be referred to herein as "a means for allocating a cache line within the target partition for a cache fill operation, responsive to determining that the memory access request does not correspond to the cache line of the plurality of cache lines." According to some aspects, the operations of block 318 for allocating the cache line 106(0) within the target partition for the cache fill operation include the cache allocation circuit 116 identifying one or more cache lines 106(0)-106(L) within the target partition as one or more eviction candidates 106(0)-106(L) (block 320). Accordingly, the cache allocation circuit 116 may be referred to herein as "a means for identifying one or more cache lines within the target partition as one or more eviction candidates." The cache allocation circuit 116 may then evict an eviction candidate 106(0) of the one or more eviction candidates 106(0)-106(L) from the shared cache memory system 100 (block 322). The cache allocation circuit 116 thus may be referred to herein as "a means for evicting an eviction candidate of the one or more eviction candidates from the shared cache memory system."

Providing shared cache memory allocation control in shared cache memory systems may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 4:
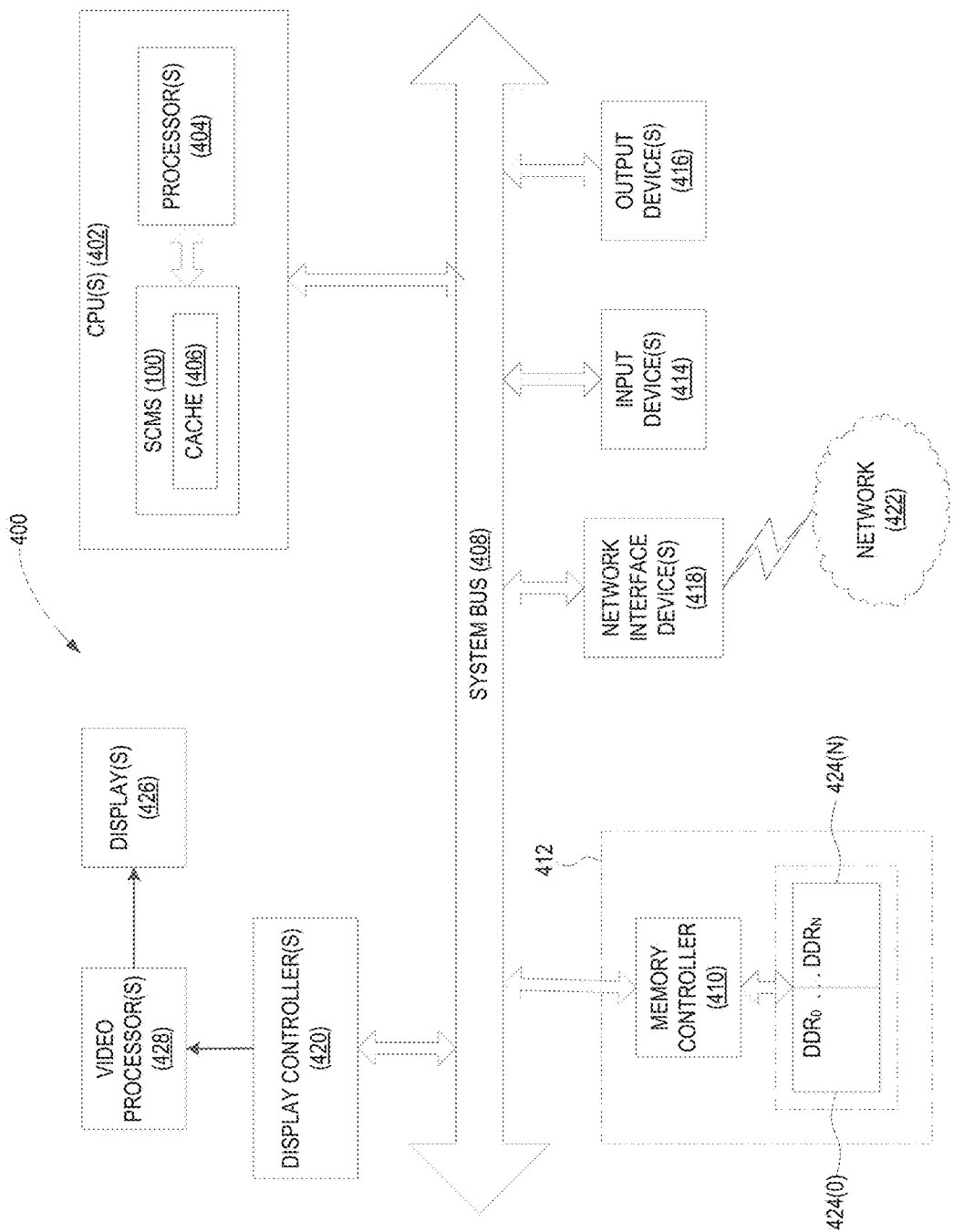
FIG. 4 is a block diagram of an exemplary processor-based system that can include the cache controller of FIG. 1 to provide shared cache memory allocation control.

In this regard, FIG. 4 is a block diagram of an exemplary processor-based system 400 that can include the shared cache memory system (SCMS) 100 having the cache controller 110 of FIG. 1. In this example, the processor-based system 400 includes one or more CPUs 402, each including one or more processors 404. The CPU(s) 402 may be a master device. The CPU(s) 402 may have cache memory 406 coupled to the processor(s) 404 for rapid access to temporarily stored data. In some aspects, the cache memory 406 may comprise the shared cache memory system 100 and/or the cache allocation circuit 116 of FIG. 1. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to a memory controller 410 as an example of a slave device.

Other master and slave devices can be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including but not limited to input keys, switches, voice processors, etc. The output device(s) 416 can include any type of output device, including but not limited to audio, video, other visual indicators, etc. The network interface device(s) 418 can be any devices configured to allow exchange of data to and from a network 422. The network 422 can be any type of network, including but not limited to a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include one or more memory units 424(0)-424(N).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A cache controller of a shared cache memory system comprising a plurality of cache lines, the cache controller comprising a cache allocation circuit comprising:
    a minimum mapping bitmask for mapping a Quality of Service (QoS) class of a plurality of QoS classes to a minimum partition of the plurality of cache lines;
    a maximum mapping bitmask for mapping the QoS class of the plurality of QoS classes to a maximum partition of the plurality of cache lines; and
    the cache allocation circuit configured to:
        receive a memory access request comprising a QoS identifier (QoSID) corresponding to the QoS class of the plurality of QoS classes;
        determine whether the memory access request corresponds to a cache line of the plurality of cache lines; and
        responsive to determining that the memory access request does not correspond to the cache line of the plurality of cache lines:
            select, as a target partition, one of the minimum partition mapped to the QoS class corresponding to the QoSID by the minimum mapping bitmask and the maximum partition mapped to the QoS class corresponding to the QoSID by the maximum mapping bitmask; and
            allocate a cache line within the target partition for a cache fill operation.

2. The cache controller of claim 1, wherein the cache allocation circuit is configured to allocate the cache line within the target partition by:
 identifying one or more cache lines of the plurality of cache lines within the target partition as one or more eviction candidates; and
 evicting an eviction candidate of the one or more eviction candidates from the shared cache memory system.

3. The cache controller of claim 1, wherein:
 the cache allocation circuit is further configured to provide an average allocation target value;
 the cache allocation circuit is configured to select, as the target partition, the one of the minimum partition and the maximum partition to cause an actual allocation of cache lines allocated to the QoS class corresponding to the QoSID to approach the average allocation target value.

4. The cache controller of claim 3, wherein:
 the cache controller further comprises a cache usage monitor for providing an indication of an allocation of the plurality of cache lines among the plurality of QoS classes; and
 the cache allocation circuit is configured to select, as the target partition, the one of the minimum partition and the maximum partition based on the indication provided by the cache usage monitor.

5. The cache controller of claim 1, wherein the cache allocation circuit is configured to select, as the target partition, the one of the minimum partition and the maximum partition by probabilistically selecting the one of the minimum partition and the maximum partition.

6. The cache controller of claim 5, further comprising a probability function provider circuit;
 wherein the cache allocation circuit is configured to probabilistically select the one of the minimum partition and the maximum partition based on the probability function provider circuit.

7. The cache controller of claim 1, wherein the minimum mapping bitmask and the maximum mapping bitmask map the QoS class of the plurality of QoS classes to a same partition of the plurality of cache lines that is exclusive to the QoS class.

8. The cache controller of claim 1, wherein:
 the minimum mapping bitmask maps the QoS class of the plurality of QoS classes to the minimum partition that is exclusive to the QoS class; and
 the maximum mapping bitmask maps the QoS class of the plurality of QoS classes to the maximum partition that is not exclusive to the QoS class.

9. The cache controller of claim 1 integrated into an integrated circuit (IC).

10. The cache controller of claim 1 integrated into a device selected from a group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

11. A cache controller of a shared cache memory system, comprising:
 a means for receiving a memory access request comprising a Quality of Service (QoS) identifier (QoSID) corresponding to a QoS class of a plurality of QoS classes;
 a means for determining whether the memory access request corresponds to a cache line of a plurality of cache lines of the shared cache memory system;
 a means for selecting, as a target partition, one of a minimum partition mapped to the QoS class corresponding to the QoSID by a minimum mapping bitmask and a maximum partition mapped to the QoS class corresponding to the QoSID by a maximum mapping bitmask, responsive to determining that the memory access request does not correspond to the cache line of the plurality of cache lines; and
 a means for allocating the cache line of the plurality of cache lines within the target partition for a cache fill operation, responsive to determining that the memory access request does not correspond to the cache line of the plurality of cache lines.

12. The cache controller of claim 11, wherein the means for allocating the cache line within the target partition comprises:
 a means for identifying one or more cache lines of the plurality of cache lines within the target partition as one or more eviction candidates; and
 a means for evicting an eviction candidate of the one or more eviction candidates from the shared cache memory system.

13. The cache controller of claim 11, further comprising a means for providing an average allocation target value;
 wherein the means for selecting, as the target partition, the one of the minimum partition and the maximum partition comprises a means for selecting the one of the minimum partition and the maximum partition to cause an actual allocation of cache lines allocated to the QoS class corresponding to the QoSID to approach the average allocation target value.

14. The cache controller of claim 13, wherein the means for selecting, as the target partition, the one of the minimum partition and the maximum partition comprises a means for selecting the one of the minimum partition and the maximum partition based on an indication of an allocation of the plurality of cache lines among the plurality of QoS classes provided by a cache usage monitor.

15. The cache controller of claim 11, wherein the means for selecting, as the target partition, the one of the minimum partition and the maximum partition comprises a means for probabilistically selecting the one of the minimum partition and the maximum partition.

16. The cache controller of claim 15, wherein the means for probabilistically selecting the one of the minimum partition and the maximum partition is based on a probability function provider circuit.

17. The cache controller of claim 11, wherein the minimum mapping bitmask and the maximum mapping bitmask map the QoS class of the plurality of QoS classes to a same partition of the plurality of cache lines that is exclusive to the QoS class.

18. The cache controller of claim 11, wherein:
 the minimum mapping bitmask maps the QoS class of the plurality of QoS classes to the minimum partition that is exclusive to the QoS class; and
 the maximum mapping bitmask maps the QoS class of the plurality of QoS classes to the maximum partition that is not exclusive to the QoS class.

19. A method for allocating cache lines of a shared cache memory system, comprising:
- receiving, by a cache allocation circuit of a cache controller, a memory access request comprising a Quality of Service (QoS) identifier (QoSID) corresponding to a QoS class of a plurality of QoS classes;
- determining whether the memory access request corresponds to a cache line of a plurality of cache lines of the shared cache memory system; and
- responsive to determining that the memory access request does not correspond to the cache line of the plurality of cache lines:
  - selecting, as a target partition, one of a minimum partition mapped to the QoS class corresponding to the QoSID by a minimum mapping bitmask and a maximum partition mapped to the QoS class corresponding to the QoSID by a maximum mapping bitmask; and
  - allocating the cache line of the plurality of cache lines within the target partition for a cache fill operation.

20. The method of claim 19, wherein allocating the cache line of the plurality of cache lines within the target partition comprises:
- identifying one or more cache lines within the target partition as one or more eviction candidates; and
- evicting an eviction candidate of the one or more eviction candidates from the shared cache memory system.

21. The method of claim 19, further comprising providing an average allocation target value;
- wherein selecting, as the target partition, the one of the minimum partition and the maximum partition comprises selecting the one of the minimum partition and the maximum partition to cause an actual allocation of cache lines allocated to the QoS class corresponding to the QoSID to approach the average allocation target value.

22. The method of claim 21, wherein selecting, as the target partition, the one of the minimum partition and the maximum partition comprises selecting the one of the minimum partition and the maximum partition based on an indication of an allocation of the plurality of cache lines among the plurality of QoS classes provided by a cache usage monitor.

23. The method of claim 19, wherein selecting, as the target partition, the one of the minimum partition and the maximum partition comprises probabilistically selecting the one of the minimum partition and the maximum partition.

24. The method of claim 23, wherein probabilistically selecting the one of the minimum partition and the maximum partition is based on a probability function provider circuit.

25. The method of claim 19, wherein the minimum mapping bitmask and the maximum mapping bitmask map the QoS class of the plurality of QoS classes to a same partition of the plurality of cache lines that is exclusive to the QoS class.

26. The method of claim 19, wherein:
- the minimum mapping bitmask maps the QoS class of the plurality of QoS classes to the minimum partition that is exclusive to the QoS class; and
- the maximum mapping bitmask maps the QoS class of the plurality of QoS classes to the maximum partition that is not exclusive to the QoS class.

* * * * *